United States Patent
Chrabaszcz et al.

[11] Patent Number: 6,154,835
[45] Date of Patent: *Nov. 28, 2000

[54] METHOD FOR AUTOMATICALLY CONFIGURING AND FORMATTING A COMPUTER SYSTEM AND INSTALLING SOFTWARE

[75] Inventors: Michael Chrabaszcz, Milpitas; Luis daSilva, San Jose, both of Calif.

[73] Assignee: Micron Electronics, Inc., Nampa, Id.

[*] Notice: This patent is subject to a terminal disclaimer.

[21] Appl. No.: 08/942,412

[22] Filed: Oct. 1, 1997

[51] Int. Cl.⁷ .................................................. G06F 9/445
[52] U.S. Cl. .................................. 713/1; 710/10
[58] Field of Search .................................. 713/1, 2, 100; 710/63, 10, 8; 712/220, 221, 222; 714/8, 48; 707/200; 709/301, 221, 222; 395/500; 711/127, 172

[56] References Cited

U.S. PATENT DOCUMENTS

| | | | |
|---|---|---|---|
| 4,057,847 | 11/1977 | Lowell et al. | 364/200 |
| 4,449,182 | 5/1984 | Rubinson et al. | |
| 4,672,535 | 6/1987 | Katzman et al. | 364/200 |
| 4,692,918 | 9/1987 | Elliott et al. | 370/85 |
| 4,695,946 | 9/1987 | Andreasen et al. | 364/200 |
| 4,707,803 | 11/1987 | Anthony, Jr. et al. | |
| 4,769,764 | 9/1988 | Levanon | 364/708 |
| 4,774,502 | 9/1988 | Kimura | 340/501 |
| 4,821,180 | 4/1989 | Gerety et al. | 364/200 |
| 4,835,737 | 5/1989 | Herrig et al. | |
| 4,949,245 | 8/1990 | Martin et al. | |
| 4,999,787 | 3/1991 | McNally et al. | |
| 5,006,961 | 4/1991 | Monico | |
| 5,007,431 | 4/1991 | Donehoo, III | 128/696 |
| 5,033,048 | 7/1991 | Pierce et al. | 371/21.2 |
| 5,051,720 | 9/1991 | Kittirutsunetorn | 340/310 R |
| 5,073,932 | 12/1991 | Yossifor et al. | 380/23 |
| 5,103,391 | 4/1992 | Barrett | 364/133 |
| 5,118,970 | 6/1992 | Olson et al. | 307/443 |
| 5,121,500 | 6/1992 | Arlington et al. | 395/750 |
| 5,136,708 | 8/1992 | Lapourtre et al. | 395/650 |
| 5,138,619 | 8/1992 | Fasang et al. | 371/21.1 |
| 5,157,663 | 10/1992 | Major et al. | 371/9.1 |
| 5,210,855 | 5/1993 | Bartol | |
| 5,245,615 | 9/1993 | Treu | 371/16.5 |
| 5,247,683 | 9/1993 | Homles et al. | 709/221 |
| 5,253,348 | 10/1993 | Scalise | 395/325 |
| 5,265,098 | 11/1993 | Mattson et al. | 371/11.1 |
| 5,266,838 | 11/1993 | Gerner | 307/19 |
| 5,269,011 | 12/1993 | Yanai et al. | |

(List continued on next page.)

FOREIGN PATENT DOCUMENTS

| | | | |
|---|---|---|---|
| 04 333 118 | 11/1992 | Japan | G06F 1/18 |
| 5-233110 | 9/1993 | Japan | G06F 3/00 |
| 07 093 064 | 4/1995 | Japan | G06F 1/26 |
| 7-093064 | 4/1995 | Japan | G06F 1/26 |
| 7-261874 | 10/1995 | Japan | G06F 1/18 |

OTHER PUBLICATIONS

Davis, T, Usenet post to alt,msdos.programmer, Apr. 1997, "Re: How do I create an FDISK batch file?".

Davis, T., Usenet post to alt.msdos.batch, Apr. 1997, "Re: Need help with automating FDISK and FORMAT . . . ".

(List continued on next page.)

*Primary Examiner*—Joseph E. Palys
*Assistant Examiner*—Rijue Mai
*Attorney, Agent, or Firm*—Knobbe, Martens, Olson & Bear, LLP

[57] ABSTRACT

A method of automatically configuring and formatting a computer system for installation of a prespecified application program in the computer system, which includes the performing the following acts: automatically creating a primary active DOS partition on a primary hard disk drive of the computer system; automatically selecting a size value for a primary extended DOS partition; automatically creating the primary extended DOS partition on the primary hard disk drive, wherein the size of the primary extended DOS partition equals the selected size value; automatically formatting each partition so as to create a root directory and a file allocation table for each partition; and automatically executing a DOS batch file in order to install said prespecified application program.

21 Claims, 4 Drawing Sheets

U.S. PATENT DOCUMENTS

| | | | |
|---|---|---|---|
| 5,272,382 | 12/1993 | Heald et al. ............................... | 307/66 |
| 5,272,584 | 12/1993 | Austruy et al. . | |
| 5,276,863 | 1/1994 | Heider .................................... | 395/575 |
| 5,280,621 | 1/1994 | Barnes et al. ........................... | 395/800 |
| 5,283,905 | 2/1994 | Saadeh et al. .......................... | 395/750 |
| 5,307,354 | 4/1994 | Cramer et al. . | |
| 5,311,451 | 5/1994 | Barrett ..................................... | 364/550 |
| 5,317,693 | 5/1994 | Cuenod et al. . | |
| 5,329,625 | 7/1994 | Kannan et al. . | |
| 5,337,413 | 8/1994 | Lui et al. . | |
| 5,351,276 | 9/1994 | Doll, Jr. et al. . | |
| 5,367,670 | 11/1994 | Ward et al. .............................. | 395/575 |
| 5,379,184 | 1/1995 | Barraza et al. .......................... | 361/685 |
| 5,386,567 | 1/1995 | Lien et al. . | |
| 5,388,267 | 2/1995 | Chan et al. ............................... | 395/700 |
| 5,402,431 | 3/1995 | Saadeh et al. ........................... | 371/67.1 |
| 5,404,494 | 4/1995 | Garney . | |
| 5,423,025 | 6/1995 | Goldman et al. ........................ | 395/575 |
| 5,430,717 | 7/1995 | Fowler et al. ........................... | 370/58.2 |
| 5,430,845 | 7/1995 | Rimmer et al. .......................... | 709/301 |
| 5,432,715 | 7/1995 | Shigematsu et al. .............. | 364/551.01 |
| 5,432,946 | 7/1995 | Allard et al. ............................. | 395/750 |
| 5,438,678 | 8/1995 | Smith ....................................... | 395/750 |
| 5,440,748 | 8/1995 | Sekine et al. . | |
| 5,455,933 | 10/1995 | Schieve et al. ..................... | 395/183.03 |
| 5,463,766 | 10/1995 | Schieve et al. .......................... | 395/650 |
| 5,471,634 | 11/1995 | Giorgio et al. .......................... | 395/600 |
| 5,473,499 | 12/1995 | Weir ......................................... | 361/58 |
| 5,483,419 | 1/1996 | Kaczeus, Sr. et al. . | |
| 5,485,550 | 1/1996 | Dalton ...................................... | 395/51 |
| 5,487,148 | 1/1996 | Komori et al. . | |
| 5,491,791 | 2/1996 | Glowny et al. . | |
| 5,493,574 | 2/1996 | McKinley . | |
| 5,493,666 | 2/1996 | Fitch . | |
| 5,513,314 | 4/1996 | Kandasamy et al. .............. | 395/182.04 |
| 5,513,339 | 4/1996 | Agrawal et al. ........................ | 395/500 |
| 5,517,646 | 5/1996 | Piccirillo et al. . | |
| 5,526,289 | 6/1996 | Dinh et al. ............................... | 364/557 |
| 5,528,409 | 6/1996 | Cucci et al. .............................. | 359/171 |
| 5,530,810 | 6/1996 | Bowman .................................. | 395/283 |
| 5,535,326 | 7/1996 | Baskey et al. ....................... | 395/182.02 |
| 5,542,055 | 7/1996 | Amini et al. ............................. | 395/281 |
| 5,546,272 | 8/1996 | Moss et al. ............................... | 361/687 |
| 5,548,712 | 8/1996 | Larson et al. ........................ | 395/182.05 |
| 5,555,510 | 9/1996 | Verseput et al. . | |
| 5,559,764 | 9/1996 | Chen et al. ............................... | 396/30 |
| 5,559,958 | 9/1996 | Farrand et al. ...................... | 395/183.03 |
| 5,559,965 | 9/1996 | Oztaskin et al. . | |
| 5,564,024 | 10/1996 | Pemberton . | |
| 5,566,299 | 10/1996 | Billings et al. ...................... | 395/182.02 |
| 5,566,339 | 10/1996 | Perholtz et al. .......................... | 395/750 |
| 5,568,610 | 10/1996 | Brown . | |
| 5,568,619 | 10/1996 | Blackledge et al. . | |
| 5,572,403 | 11/1996 | Mills ......................................... | 361/695 |
| 5,577,205 | 11/1996 | Hwang et al. . | |
| 5,579,487 | 11/1996 | Meyerson et al. ....................... | 395/280 |
| 5,579,491 | 11/1996 | Jeffries et al. . | |
| 5,581,712 | 12/1996 | Herrman . | |
| 5,581,714 | 12/1996 | Amini et al. . | |
| 5,584,030 | 12/1996 | Husak et al. ............................. | 395/750 |
| 5,586,250 | 12/1996 | Carbonneau et al. ............... | 395/183.2 |
| 5,588,121 | 12/1996 | Reddin et al. ...................... | 395/200.15 |
| 5,588,144 | 12/1996 | Inoue et al. . | |
| 5,596,711 | 1/1997 | Burckhartt et al. ................. | 395/182.21 |
| 5,598,407 | 1/1997 | Bud et al. ................................. | 370/330 |
| 5,602,758 | 2/1997 | Lincoln et al. .......................... | 364/505 |
| 5,606,672 | 2/1997 | Wade . | |
| 5,608,876 | 3/1997 | Cohen et al. . | |
| 5,615,207 | 3/1997 | Gephardt et al. . | |
| 5,621,159 | 4/1997 | Brown et al. ............................. | 73/9 |
| 5,622,221 | 4/1997 | Genga, Jr.et al. ....................... | 165/208 |
| 5,625,238 | 4/1997 | Ady et al. ................................. | 307/147 |
| 5,627,962 | 5/1997 | Goodrum et al. .................. | 395/182.11 |
| 5,628,028 | 5/1997 | Michelson ................................ | 395/825 |
| 5,630,076 | 5/1997 | Saulpaugh et al. ...................... | 395/284 |
| 5,631,847 | 5/1997 | Kikinis ................................ | 364/514 R |
| 5,632,021 | 5/1997 | Jennings et al. . | |
| 5,638,289 | 6/1997 | Yamada et al. . | |
| 5,644,470 | 7/1997 | Benedict et al. . | |
| 5,644,731 | 7/1997 | Liencres et al. . | |
| 5,651,006 | 7/1997 | Fujino et al. . | |
| 5,652,832 | 7/1997 | Kane et al. . | |
| 5,652,839 | 7/1997 | Giorgio et al. ..................... | 395/200.11 |
| 5,652,892 | 7/1997 | Ugajin ...................................... | 395/750 |
| 5,652,908 | 7/1997 | Douglas et al. ......................... | 395/800 |
| 5,655,081 | 8/1997 | Bonnell et al. . | |
| 5,655,083 | 8/1997 | Bagley ................................ | 395/182.31 |
| 5,655,148 | 8/1997 | Richman et al. . | |
| 5,659,682 | 8/1997 | Devarakonda et al. . | |
| 5,664,118 | 9/1997 | Nishigaki et al. ....................... | 395/283 |
| 5,664,119 | 9/1997 | Jeffries et al. . | |
| 5,666,538 | 9/1997 | DeNicola . | |
| 5,668,992 | 9/1997 | Hammer et al. ......................... | 395/651 |
| 5,669,009 | 9/1997 | Buktenica et al. .................. | 395/800.35 |
| 5,671,371 | 9/1997 | Kondo et al. ............................ | 395/306 |
| 5,675,723 | 10/1997 | Ekrot et al. . | |
| 5,680,288 | 10/1997 | Carey et al. . | |
| 5,684,671 | 11/1997 | Hobbs et al. . | |
| 5,689,637 | 11/1997 | Johnson et al. . | |
| 5,696,895 | 12/1997 | Hemphill et al. ................... | 395/182.02 |
| 5,696,899 | 12/1997 | Kalwitz . | |
| 5,696,949 | 12/1997 | Young ...................................... | 395/551 |
| 5,696,970 | 12/1997 | Sandage et al. . | |
| 5,704,031 | 12/1997 | Mikami et al. ..................... | 395/182.02 |
| 5,708,775 | 1/1998 | Nakamura ........................... | 395/185.01 |
| 5,708,776 | 1/1998 | Kikinis ............................... | 395/185.08 |
| 5,712,754 | 1/1998 | Sides et al. ............................... | 361/58 |
| 5,715,456 | 2/1998 | Bennett et al. .......................... | 395/652 |
| 5,721,935 | 2/1998 | DeSchepper et al. .................. | 395/750 |
| 5,724,529 | 3/1998 | Smith et al. . | |
| 5,726,506 | 3/1998 | Wood . | |
| 5,727,207 | 3/1998 | Gates et al. .............................. | 395/651 |
| 5,732,266 | 3/1998 | Moore et al. ............................ | 395/651 |
| 5,737,708 | 4/1998 | Grob et al. ............................... | 455/557 |
| 5,740,378 | 4/1998 | Rehl et al. . | |
| 5,742,514 | 4/1998 | Bonola ..................................... | 364/492 |
| 5,742,833 | 4/1998 | Dea et al. ............................. | 395/750.05 |
| 5,747,889 | 5/1998 | Raynham et al. . | |
| 5,748,426 | 5/1998 | Bedingfield et al. . | |
| 5,752,164 | 5/1998 | Jones ........................................ | 455/33.1 |
| 5,754,797 | 5/1998 | Takahashi . | |
| 5,758,165 | 5/1998 | Shuff ........................................ | 395/712 |
| 5,758,352 | 5/1998 | Reynolds et al. ....................... | 707/200 |
| 5,761,033 | 6/1998 | Wilhelm . | |
| 5,761,045 | 6/1998 | Olson et al. . | |
| 5,761,085 | 6/1998 | Giorgio .................................... | 364/505 |
| 5,761,462 | 6/1998 | Neal et al. . | |
| 5,761,707 | 6/1998 | Aiken et al. ............................. | 711/118 |
| 5,764,924 | 6/1998 | Hong ........................................ | 395/281 |
| 5,764,968 | 6/1998 | Ninomiya . | |
| 5,765,008 | 6/1998 | Desai et al. . | |
| 5,765,198 | 6/1998 | McCrocklin et al. . | |
| 5,767,844 | 6/1998 | Stoye ........................................ | 345/212 |
| 5,768,541 | 6/1998 | Pan-Ratzlaff . | |
| 5,768,542 | 6/1998 | Enstrom et al. . | |
| 5,771,343 | 6/1998 | Hafner et al. ....................... | 395/182.02 |
| 5,774,645 | 6/1998 | Beaujard et al. .................... | 395/183.01 |
| 5,774,741 | 6/1998 | Choi . | |
| 5,777,897 | 7/1998 | Giorgio .................................... | 364/557 |
| 5,778,197 | 7/1998 | Dunham ................................... | 395/284 |
| 5,781,703 | 7/1998 | Desai et al. . | |
| 5,781,716 | 7/1998 | Hemphill et al. ................... | 395/182.02 |

| | | | |
|---|---|---|---|
| 5,781,744 | 7/1998 | Johnson et al. | 395/283 |
| 5,781,767 | 7/1998 | Inoue et al. . | |
| 5,784,555 | 7/1998 | Stone | 395/200.5 |
| 5,784,576 | 7/1998 | Guthrie et al. . | |
| 5,787,019 | 7/1998 | Knight et al. | 364/550 |
| 5,787,459 | 7/1998 | Stallmo et al. | 711/112 |
| 5,787,491 | 7/1998 | Merkin et al. | 711/173 |
| 5,790,775 | 8/1998 | Marks et al. | 395/182.07 |
| 5,790,831 | 9/1998 | Lin et al. . | |
| 5,793,948 | 8/1998 | Asahi et al. | 395/184.01 |
| 5,793,987 | 8/1998 | Quackenbush et al. . | |
| 5,794,035 | 8/1998 | Golub et al. . | |
| 5,796,185 | 8/1998 | Takata et al. . | |
| 5,796,580 | 8/1998 | Komatsu et al. | 361/687 |
| 5,796,981 | 8/1998 | Abudayyeh et al. . | |
| 5,797,023 | 8/1998 | Berman et al. | 395/750.06 |
| 5,798,828 | 8/1998 | Thomas et al. . | |
| 5,799,036 | 8/1998 | Staples . | |
| 5,799,196 | 8/1998 | Flannery | 395/750.03 |
| 5,801,921 | 9/1998 | Miller . | |
| 5,802,269 | 9/1998 | Poisner et al. . | |
| 5,802,298 | 9/1998 | Imai et al. | 395/200.47 |
| 5,802,305 | 9/1998 | McKaughan et al. | 395/200.57 |
| 5,802,324 | 9/1998 | Wunderlich et al. | 395/281 |
| 5,802,393 | 9/1998 | Begun et al. . | |
| 5,802,552 | 9/1998 | Fandrich et al. . | |
| 5,802,592 | 9/1998 | Chess et al. | 711/164 |
| 5,803,357 | 9/1998 | Lakin | 236/78 B |
| 5,805,804 | 9/1998 | Laursen et al. | 395/200.02 |
| 5,805,834 | 9/1998 | McKinley et al. . | |
| 5,809,224 | 9/1998 | Schultz et al. . | |
| 5,809,256 | 9/1998 | Najemy | 395/283 |
| 5,809,287 | 9/1998 | Stupek, Jr. et al. | 395/500 |
| 5,809,311 | 9/1998 | Jones | 395/750.01 |
| 5,809,555 | 9/1998 | Hobson | 711/172 |
| 5,812,748 | 9/1998 | Ohran et al. | 395/182.02 |
| 5,812,750 | 9/1998 | Dev et al. . | |
| 5,812,757 | 9/1998 | Okamoto et al. . | |
| 5,812,858 | 9/1998 | Nookala et al. . | |
| 5,815,117 | 9/1998 | Kolanek . | |
| 5,815,647 | 9/1998 | Buckland et al. | 395/182.01 |
| 5,815,652 | 9/1998 | Ote et al. . | |
| 5,821,596 | 10/1998 | Miu et al. | 257/419 |
| 5,822,547 | 10/1998 | Boesch et al. . | |
| 5,835,719 | 11/1998 | Gibson et al. | 395/200.51 |
| 5,835,738 | 11/1998 | Blackledge, Jr. et al. . | |
| 5,838,932 | 11/1998 | Alzien | 395/308 |
| 5,841,964 | 11/1998 | Yamaguchi | 395/113.21 |
| 5,841,991 | 11/1998 | Russell . | |
| 5,852,720 | 12/1998 | Gready et al. . | |
| 5,852,724 | 12/1998 | Glenn, II et al. | 395/200.69 |
| 5,857,074 | 1/1999 | Johnson . | |
| 5,857,102 | 1/1999 | McChesney et al. | 395/653 |
| 5,864,653 | 1/1999 | Tavallaei et al. | 315/181 |
| 5,867,730 | 2/1999 | Leyda | 710/10 |
| 5,871,798 | 2/1999 | Beatty et al. . | |
| 5,875,307 | 2/1999 | Ma et al. | 395/281 |
| 5,875,308 | 2/1999 | Egan et al. | 395/283 |
| 5,875,310 | 2/1999 | Buckland et al. | 395/306 |
| 5,878,237 | 3/1999 | Olarig | 395/308 |
| 5,878,238 | 3/1999 | Gan et al. | 395/308 |
| 5,881,311 | 3/1999 | Woods | 395/824 |
| 5,884,027 | 3/1999 | Garbus et al. | 395/200.8 |
| 5,889,965 | 3/1999 | Wallach et al. | 395/283 |
| 5,892,898 | 4/1999 | Fujii et al. | 395/185.1 |
| 5,892,928 | 4/1999 | Wallach et al. | 395/283 |
| 5,898,888 | 4/1999 | Guthrie et al. | 395/308 |
| 5,905,867 | 5/1999 | Giorgio | 395/200.54 |
| 5,907,672 | 6/1999 | Matze et al. | 714/8 |
| 5,909,568 | 6/1999 | Nason | 395/500 |
| 5,911,779 | 6/1999 | Stallmo et al. | 714/6 |
| 5,913,034 | 6/1999 | Malcolm | 395/200.53 |
| 5,922,060 | 7/1999 | Goodrum | 710/103 |
| 5,930,358 | 7/1999 | Rao | 380/4 |
| 5,935,262 | 8/1999 | Barrett et al. | 714/46 |
| 5,936,960 | 8/1999 | Stewart | 370/438 |
| 5,938,751 | 8/1999 | Tavallaei et al. | 710/103 |
| 5,941,996 | 8/1999 | Smith et al. | 714/47 |
| 5,964,855 | 10/1999 | Bass et al. | 710/103 |
| 5,983,349 | 11/1999 | Kodama et al. | 713/200 |
| 5,987,627 | 11/1999 | Rawlings, III | 714/48 |

OTHER PUBLICATIONS

NetFrame Systems Incorporated, Doc. No. 78–1000226–01, pp. 1–2, 5–8, 359–400, and 471–512, Apr. 1996, "NetFrame Clustered Multiprocessing Software: NW0496 DC–ROM for Novell® NetWare® 4.1 SMP, 4.1 and 3.12."

Shanley, and Anderson PCI System Architecture, Third Edition, Chapter 15, pp. 297–302, Copyright 1995, "Intro To Configuration Address Space."

Shanley, and Anderson, PCI System Architecture, Third Edition, Chapter 16, pp. 303–328, Copyright 1995, "Configuration transactions."

Sun Microsystems Computer Company, Part No. 802–5355–10, Rev. A, May 1996, "Solstice SyMON User's Guid."

Sun Microsystems, Part No. 802–6569–11, Release 1.0.1, Nov. 1996, "Remote Systems Diagnostics Installation & User Guide."

Shanley and Anderson, PCI System Architecture, Third Edition, Chapters 15 & 16, pp. 297–328, CR 1995.

PCI Hot–Plug Specification, Preliminary Revision for Review Only, Revision 0.9, pp i–iv, and 1–25, Mar. 5, 1997.

SES–SCSI–3 Enclosure Services, X3T10/Project 1212–D/ Rev 8a, pp. i, iii–x, 1–76, and I–1 (index), Jan. 16, 1997.

Compaq Computer Corporation, Technology Brief, pp. 1–13, Dec. 1996, "Where Do I Plug the Cable? Solving the Logical–Physical Slot Numbering Problem."

Lyons, Computer Reseller News, Issue 721, pp. 61–62, Feb. 3, 1997, "ACC Releases Low–Cost Solution for ISPs."

M2 Communications, M2 Presswire, 2 pages, Dec. 19, 1996, "Novell IntranetWare Supports Hot Pluggable PCI from NetFRAME."

Rigney, PC Magazine, 14(17):375–379, Oct. 10, 1995, "The One for the Road (Mobile–aware capabilities in Windows 95)."

Shanley, and Anderson, PCI System Architecture, Third Edition, p. 382, Copyright 1995.

Gorlick, M., Conf. Proceedings: ACM/ONR Workshop on Parallel and Distributed Debugging, pp. 175–181, 1991, "The Flight Recorder: An Architectural Aid for System Monitoring."

IBM Technical Disclosure Bulletin 92A+62947, pp. 391–394, Oct. 1992, Method for Card Hot Plug Detection and Control.

FIG. 1D

METHOD FOR AUTOMATICALLY CONFIGURING AND FORMATTING A COMPUTER SYSTEM AND INSTALLING SOFTWARE

RELATED APPLICATIONS

This application is related to U.S. patent application Ser. No. 08/941,955 entitled, "System For Automatically Configuring And Formatting A Computer System and Installing Software," which is filed concurrently herewith.

APPENDICES

Appendix A, which forms a part of this disclosure, is a list of commonly owned copending U.S. patent applications. Each one of the applications listed in Appendix A is hereby incorporated herein in its entirety by reference thereto.

COPYRIGHT RIGHTS

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

1. Field of the Invention

The invention relates to installing software into a computer system. More particularly, the invention relates to automatically configuring and formatting a computer system in preparation for installing a prespecified software program in the computer system, and automatically installing the prespecified software program and any additional software that may be desired.

2. Description of the Related Technology

There are manual procedures for installing software programs in a computer system that are cumbersome and time consuming. These prior art methods require the installation of a disk operating system (DOS) onto the computer and then the use of DOS based utilities to configure the system. A FDISK utility program is typically used to configure the memory space of the computer system and create partitions corresponding to a main hard drive memory space (C:\), a backup memory space (D:\) for storing "core dumps" in the event of system failures, and a system drive (SYS:\), otherwise known as the "free" drive, for storing application programs such as the Intranetware® software program manufactured by Novell®, for example. In order to create and configure such partitions, a system operator must enter the FDISK utility program and input information such as the size of each partition, the type of each partition, and the type of system which will use the partition, etc. The FDISK utility program is well-known in the art. This process is tedious and time-consuming, especially if the system operator is not familiar with the meaning and effects of these parameters and the requirements of a particular application program which may be executed by the system.

After the memory space of the system has been partitioned and configured as described above, the system operator must reboot the system so that the newly created partitions are recognized by the basic input output system (BIOS) upon reboot. As is well-known in the art, when a system is booted up, BIOS initializes all devices, allocates resources and passes control to the operating system. Next, the system operator executes a DOS FORMAT utility program to format each partition. The FORMAT utility is typically used to format the hard disk drive of the system for use with MS-DOS. Additionally, this utility may also be used to format a floppy disk which is loaded into a floppy disk drive of the system. The FORMAT command creates a new root directory and a file allocation table for each partition so that files may be accessed for the purpose of writing to and reading from the files. The FORMAT utility program is also well-known in the art.

After creating the partitions, and formatting each partition, as described above, the system operator is required to load and configure proper CD drivers from DOS so that a software application program can be loaded into the SYS:\ memory space from a CD ROM disk drive coupled to the system. The system operator is must choose the proper CD driver for the particular software application installation program, such as Intranetware® Install, for example, and to also make sure there is no conflict with existing CD drivers. Often, the system operator does not know which one of multiple DOS CD drivers to choose and this process becomes confusing and frustrating. Additionally, the system operator must modify the startup configuration of the system by entering appropriate commands and text into the AUTOEXEC.BAT and CONFIG.SYS files.

Next, the system operator once again reboots the system so that the CD driver file which he or she previously selected is stored in the C:\ drive (partition). The system operator must then ensure that the CONFIG.SYS file contains the command to execute the CD driver files. The CONFIG.SYS file is a text file that contains special commands that configure the computer's hardware so that MS-DOS and other software applications can use them. Typically, the CONFIG.SYS file is located in the root directory of drive C:\.

After the second reboot, the system operator is ready to install the application software. He or she then inserts a floppy diskette or CD ROM disk into a CD ROM drive coupled to the system and loads the application program from the CD ROM drive into the free memory partition. The application program typically formats this free partition by creating a root directory called SYS:\ and creates a file allocation table which lists each of the files used in the application program.

The system operator may desire to install additional software, such as Netframe® value-add software. To do so, the system operator typically inserts a floppy diskette or CD ROM diskette into a respective drive of the system. The floppy diskette or CD ROM diskette contains the additional software which is subsequently copied from the diskette into the system's hard disk drive.

For mirrored or duplexed computer systems, all or some of the above steps must be repeated in order to configure and format the mirrored or backup hard disk drives of these systems and to load the various software programs discussed above. This process is tedious and time-consuming. For a user who is somewhat inexperienced which such a process, the process can be quite daunting.

Therefore, what is needed is a fast and simple method and system for automatically configuring a computer system and installing an applications program, such as Intranetware® manufactured by Novell®, as well as additional value-add software. What is needed is a method and system which requires minimal human interaction for configuring the system and formatting its memory spaces for installation of a prespecified software application program and additional value-add software so as to reduce the amount of time that a system operator must spend performing this task.

SUMMARY OF THE INVENTION

The invention addresses the above and other needs by providing a method and system for automatically configuring the computer system, formatting each memory space or partition of the computer system and copying appropriate drivers to a main hard disk drive of the computer system such that a preselected application program, and any additionally desired software, may be quickly and easily installed.

In one embodiment of the invention, a method of automatically configuring and formatting a computer system for installation of a prespecified application program in the computer system, includes the acts of: automatically creating a primary active DOS partition on a primary hard disk drive of the computer system; automatically selecting a size value for a primary extended DOS partition; automatically creating the primary extended DOS partition on the primary hard disk drive, wherein the size of the primary extended DOS partition equals the selected size value; and automatically formatting each partition so as to create a root directory and a file allocation table for each partition.

In another embodiment, a method of automatically configuring and formatting a computer system and installing a prespecified program, includes: inserting a first memory device into a first reading device of the computer system; supplying power to the computer system; executing an operating system program in the computer system, wherein the operating system program is stored on a first memory device; automatically creating a primary active DOS partition on a primary hard disk drive of the computer system; automatically selecting a size value for a primary extended DOS partition; automatically creating the primary extended DOS partition, wherein the size of the primary extended DOS partition equals the selected size value; automatically rebooting the computer system for a first time by making a first low level call to BIOS; automatically formatting the primary active and extended DOS partitions so as to create a root directory and a file allocation table for each partition; automatically copying a specified driver to the primary active DOS partition; automatically copying customized CONFIG.SYS and AUTOEXEC.BAT startup files from a first memory device to the primary active DOS partition; removing a first memory device from a first reading device; automatically rebooting the computer system for a second time by making a second low level call to BIOS; inserting a second memory device into a second reading device of the computer system, wherein the second memory device contains the prespecified program; and automatically executing a DOS batch file in order to install said prespecified program.

DETAILED DESCRIPTION OF THE INVENTION

The invention is described in detail below with reference to the figures, wherein like elements are referenced with like numerals throughout. It is understood that the embodiments described below are merely illustrative of the invention and should not be construed to limit the scope of the invention as indicated by the appended claims.

In one embodiment, the invention is a method and system of automatically configuring and formatting a computer/server system in order to facilitate installation of a prespecified application program, such as IntranetWare® manufactured by Novell®. The method and system may also include automatically installing the application program and any additionally desired software into the computer/server system. The invention is referred to herein as the Automatic Configuration, Formatting and Installation (ACFI) program, or simply "the ACFI program." Unless otherwise indicated, the term "the program" refers to the ACFI program. Although reference is made to other programs such as IntranetWare Install®, which is the installation program for installing IntranetWare®, manufactured by Novell®, it is understood that this commercially available program is only one of many such programs which the ACFI program of the invention may incorporate, or encapsulate, into its overall ACFI programming. This concept of encapsulation is described in further detail below. Additionally, as used herein, the term "module" refers to any software program, subprogram, subroutine of a program, or software code capable of performing a specified function.

Figure 1A:
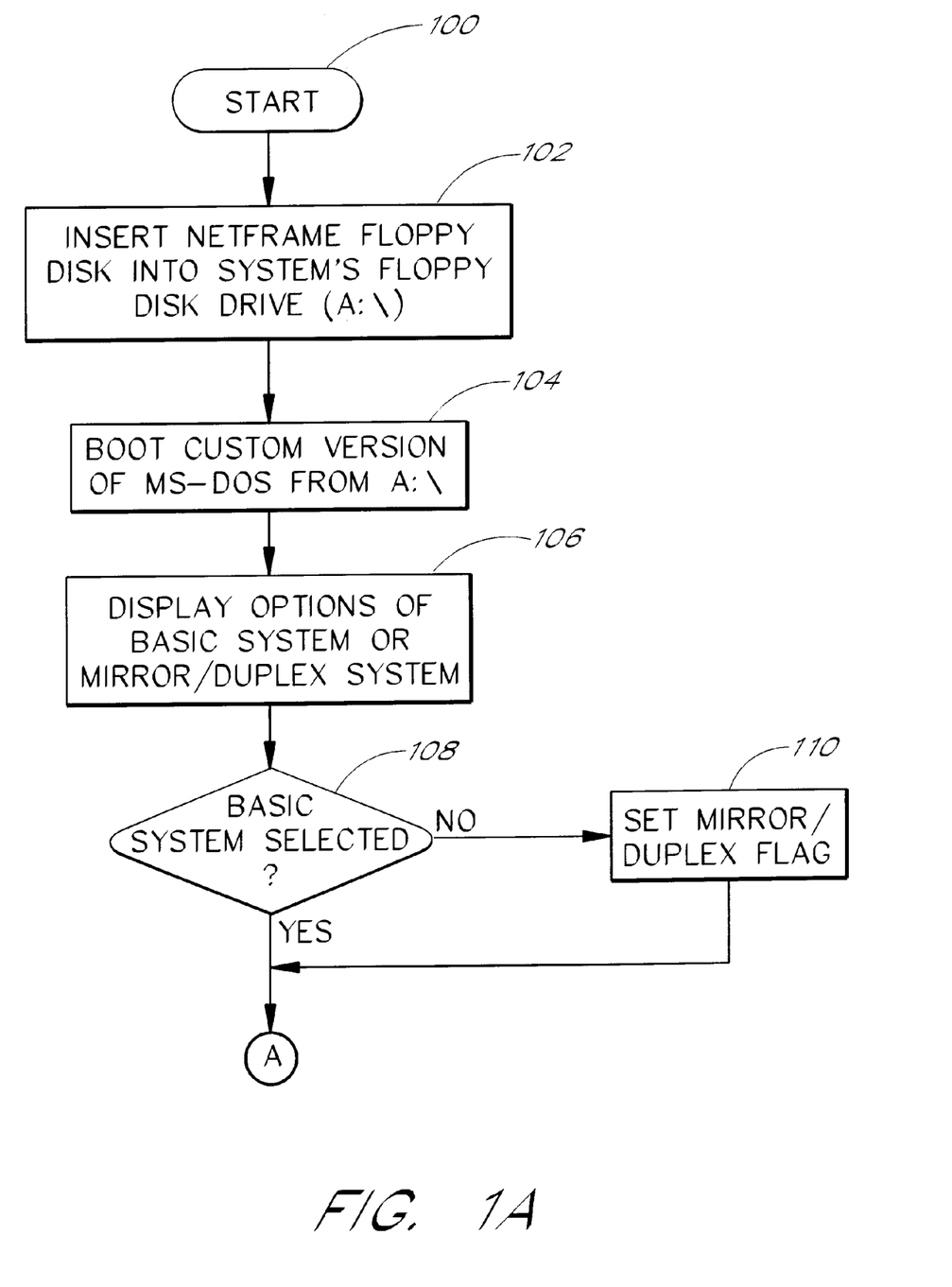
FIG. 1A–1D illustrate a flowchart of one embodiment of a process for automatically configuring and formatting a computer system for installation of an Intranetware software application program and additional Netframe® value-added software, in accordance with the invention.

FIGS. 1A–1D illustrate a flowchart of one embodiment of a method of automatically configuring and formatting a computer system and automatically installing a prespecified software application program and additional software which may be desired. Referring to FIG. 1A, the ACFI program starts at step 100 and proceeds to step 102 wherein a Netframe® floppy disk, containing the ACFI program is inserted into a floppy disk drive (A:\) of a computer system. The program proceeds to step 104 in which a customized version of MS-DOS is booted from the floppy disk drive of the computer system in accordance with a basic input output system (BIOS) of the computer system. The BIOS is a software program stored within a read only memory (ROM) chip that is accessed by the central processing unit(s) of the computer system. Upon initially powering a computer system, it is the BIOS which initializes all the devices, e.g., the hard drive, the floppy drive, CD ROM drive, etc, of the system, and allocates resources of the system. Upon detecting the Netframe® floppy diskette in the floppy disk drive, the BIOS automatically loads the customized version of MS-DOS from the floppy into the random access memory (RAM) of the computer system for execution and thereafter "passes" control over to this customized operating system (OS). The BIOS and its functionality and protocol are well-known in the art.

As discussed herein, a floppy diskette is used as an exemplary storage device for the ACFI program of the invention. However, it is understood that any other type of storage device which is commercially available, such as a compact disk, may be used for purposes of storing the ACFI program therein. Similarly, the discussion of the floppy disk drive herein is only exemplary and it is understood that any other type of reading device which is commercially available, such as a CD ROM drive, may be utilized in the invention, depending on the type of storage device in which the ACFI program is stored.

The Netframe® floppy diskette contains a very small subset of MS-DOS and does not require MS-DOS installation to be performed on the hard drive. This small subset of MS-DOS contains only the basic file operating system necessary to access the C:\ drive of the computer and execute customized Netframe® versions of CONFIG.SYS and AUTOEXEC.BAT files which are also stored on the floppy. The basic file operating system of MS-DOS contains what are known in the industry as the "implied commands"

of MS-DOS. This "stripped down" version of MS-DOS typically does not include other utilities and documentation which are part of the complete MS-DOS program. The initial boot will run the customized operating system from the floppy diskette. CONFIG.SYS and AUTOEXEC.BAT are the start-up files which are initially executed by an OS upon powering up a computer system. The purpose and functionality of these start-up files are well-known in the art.

The customized AUTOEXEC.BAT file stored on the Netframe® floppy executes the ACFI program. The ACFI program first creates a display on the monitor screen of the computer which instructs and/or informs a system operator how to interact with the program by displaying queries and prompts, for example, and further informs the operator of the status of a particular operation or event carried out by the program. In one embodiment, the display mimics the screens used by Novell® in their IntranetWare® installation program.

Next, in step 106, the program displays system options and prompts the operator to choose one of the options. Typically, the options include system architecture choices such as a mirrored system, a duplex system, or a basic system which utilizes only one hard disk drive. In a mirrored system, a primary hard disk drive is mirrored by a secondary hard disk drive. That is, the secondary hard disk drive contains a copy of all the files and/or data contained in the primary disk drive. This is done for purposes of redundancy and ensuring data integrity by comparing data from the primary drive with corresponding data from the secondary drive and verifying that they match. Mirrored computer systems are well-known in the art.

In duplex hard drive systems, there are two adapters and two hard disk drives. Each adapter is responsible for accessing, storing and retrieving data, commands, etc. from its respective disk drive. Similar to mirroring, each disk drive contains the exact same files and data as the other. Duplex hard drive systems are also well-known in the art.

After the installation program displays the above system architecture options, the system operator will pick one of the three options depending on the actual configuration or architecture of his or her system. In step 108, the program determines if a basic system architecture was selected. If it is determined in step 108 that a basic system was not selected, the program moves to step 110 in which a mirror/duplex flag is set. The program then proceeds to step 112 of FIG. 1B. If it is determined in step 108 that the basic system configuration was selected, the program proceeds directly to step 112 of FIG. 1B.

Figure 1B:
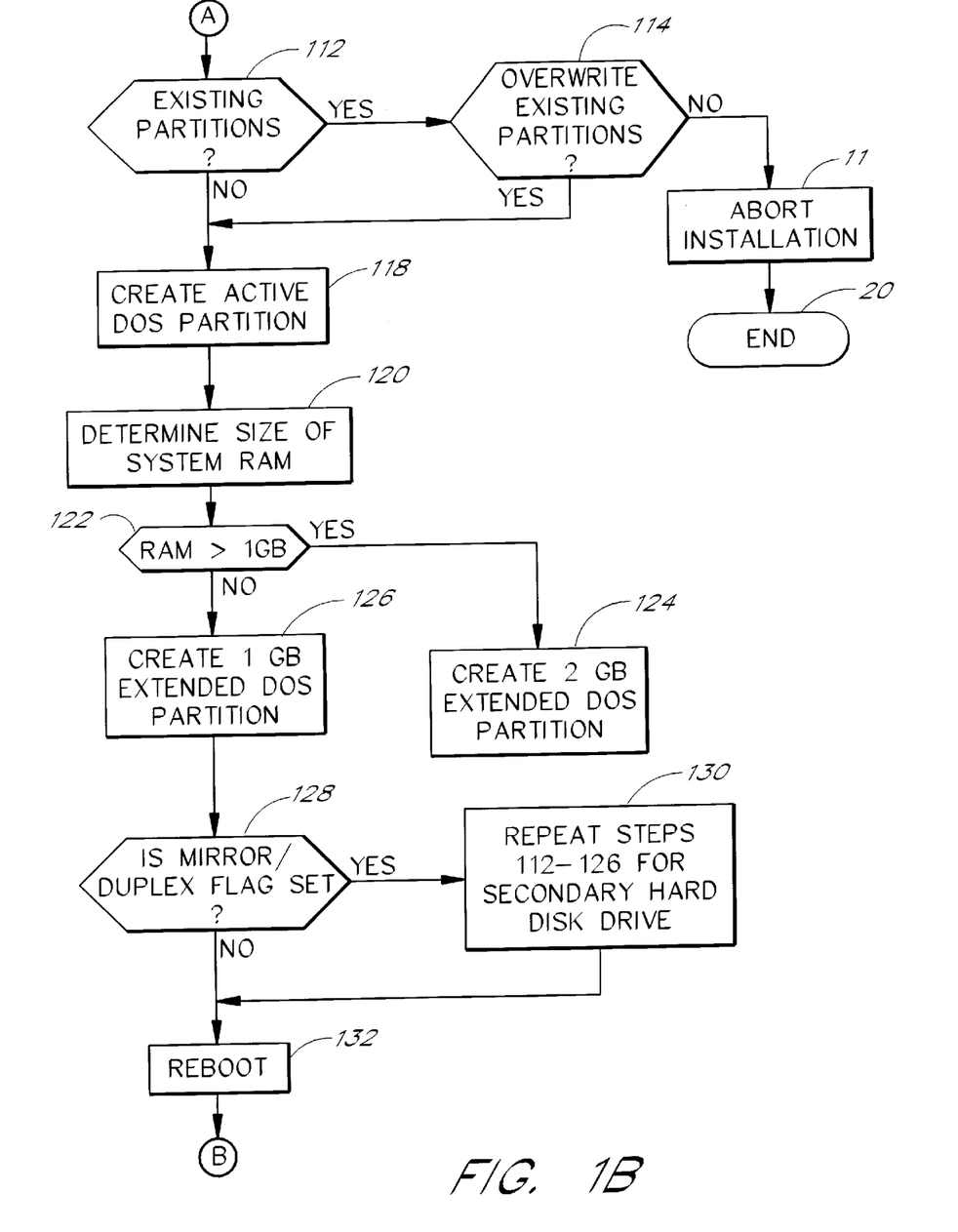

Referring to FIG. 1B, in step 112, the program queries the BIOS whether there are existing partitions on the primary hard disk drive. If in step 112, it is determined that there are preexisting partitions on the hard disk drive, the program proceeds to step 114 which queries the system operator whether he or she wants to overwrite the existing partitions. If in step 114, the system operator answers NO, the program executes step 116 and aborts the installation process after which the program ends at step 200. However, if in step 114, the system operator answers YES, the program proceeds to step 118 in which the active DOS partition is created. As discussed above, the active DOS partition creates the main storage space on the hard disk drive, typically called the C:\ drive. In one embodiment, the active DOS partition is set at a default size of 100 Mega Bytes (MB). The process of creating the active DOS partition is explained in further detail below.

Next, in step 120, the program determines the size of the random access memory (RAM) of the system. This is done by making a low-level call to the BIOS which retrieves and stores this information upon initial power up when it scans for system devices/resources. Depending on the size of the RAM, the program partitions the extended DOS memory space to be a particular size. The main purpose for partitioning the extended DOS memory space in accordance with the size of the RAM is to use the extended DOS partition as a "core dump" memory in the event of system failures. Application programs have been specifically developed which essentially take a "snap shot" of the contents of the RAM prior to system shutdown. One such program is the "Coredump" program, manufactured by Novell®. This snap shot is then "dumped" into the extended DOS partition. Therefore, it is necessary to ensure that the extended DOS partition is large enough to store all the contents of the RAM prior to shutdown. In typical server systems, it is not uncommon for the RAM to be in range of 0.5 to 2 gigabytes (GB).

In step 122, the program compares the size of the RAM determined in step 120 to a value of 1 gigabyte (GB). If the RAM is larger than 1 GB, the program proceeds to step 124 in which an extended DOS partition of 2 GB is created. If the RAM is smaller than 1 GB, the program proceeds to step 126 in which a 1 GB extended DOS partition is created. In steps 124 and 126 only two different sizes for the extended DOS partition are offered in order to simplify the process of creating the extended DOS partition. However, it is understood that additional and/or different sizes for the extended DOS partition can be provided by the invention. For example, the program can be modified to compare the RAM size to a more refined set of limits such as size<500 MB; 500 MB<size<1 GB; 1 GB<size<1.5 GB; and 1.5 GB<size<2 GB and to create extended DOS partition sizes of 500 MB, 1 GB, 1.5 GB and 2 GB, respectively. Other partition sizes may be accommodated depending on the type of system and the size of the RAM in the system.

In step 128, the program determines whether the mirror/duplex flag is set. If the mirror/duplex flag is set, then the program proceeds to step 130 in which the above partitioning steps, steps 112–126, are repeated for the secondary hard disk drive.

There is a known, finite number of combinations that a system's hard drive(s) can be partitioned into. In a single drive configuration, the device is typically subdivided into three partitions: an active DOS partition (C:\) which is the main memory of the system, an extended DOS partition (D:\) to accommodate IntranetWare core dumps, for example, and a free area that is used by installation programs such as IntranetWare Install, for example. For duplex or mirrored systems, the first disk drive is partitioned into a first active DOS partition (C:\), a first extended (dump) partition (E:\) and a first free partition. The second disk drive is partitioned into a second active DOS partition (D:\), a second extended (dump) partition (F:\) and a second free partition.

The partitions are created using a set of prefabricated Master Boot Record, Boot Record and Extended Boot Record files which are contained on the floppy diskette. The Master Boot Record file contains information pertaining to the size of all the partitions and includes an index which contains the addresses (sector, track and cylinder) of each partition. The Boot Record contains similar information pertaining to the active DOS partition only and the Extended Boot Record contains the information pertaining to the extended DOS partition. After the size of the active DOS partition and the extended DOS partition have been allocated, any remaining memory space on the hard disk drive is allocated as the "free" partition. In order to create the partitions, the information from the Master Boot Record, the Boot Record and the Extended Boot Record is written to the appropriate sectors on the hard drive using low level Basic Input Output System (BIOS) calls. The Master Boot Record, Boot Record and Extended Boot Record files are well-known in the art.

In order for MS-DOS to recognize the partitions created above, the system must be rebooted. In step 132, the program makes a low level BIOS call to reboot the system automatically. Upon rebooting, the BIOS program once again scans the devices of the computer/server system and detects the partitions created on the hard disk drive. Since the Netframe® floppy is still in the floppy disk drive at this time, the BIOS detects it and runs the customized operating system from the floppy. The customized AUTOEXEC.BAT file on the floppy will once again initiate the ACFI program. However, after the first reboot, the ACFI program recognizes the partition step has already been performed and does not repeat these steps. Furthermore, the program detects whether a dual disk installation has been previously selected. The program essentially "remembers" that these steps were performed prior to rebooting and, therefore, does not perform them again. This "recall" is accomplished by temporarily writing information to the floppy disk and saving it as a file prior to the reboot. This file is read after the reboot and serves as a reminder to the program of where it left off. This information is typically removed after the reboot.

Figure 1C:
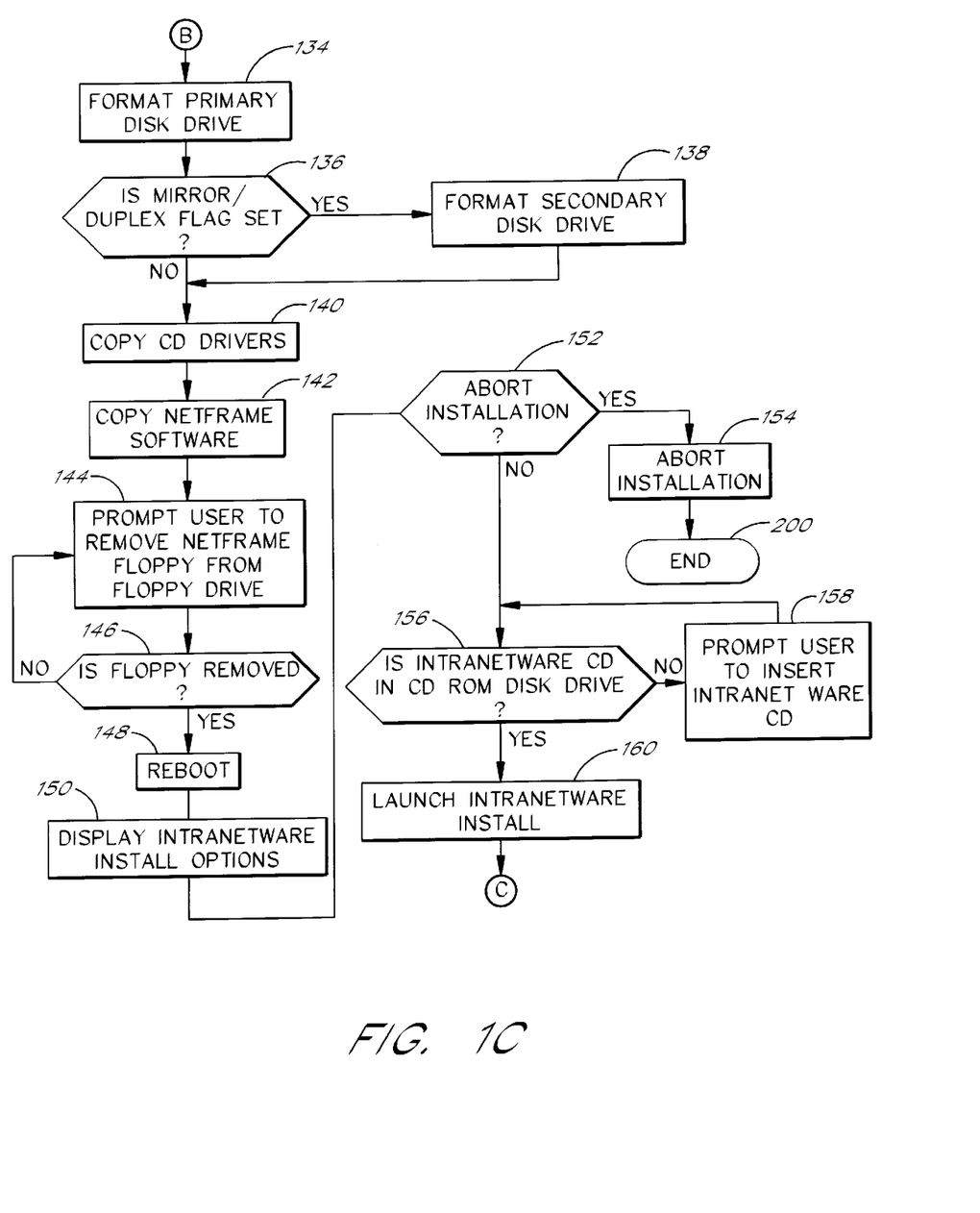

Referring to FIG. 1C, in step 134, the program begins formatting each of the partitions created in the primary disk drive by automatically executing a DOS FORMAT utility program stored on the floppy. One of the primary functions of formatting is to create a root directory (e.g., c:\, d:\, etc.) and a file allocation table which allows files stored within each partition to be located and accessed. Another function of the format step 134 is to copy, or "gen" as it is known in the industry, the MS-DOS program from the floppy disk to the active DOS partition (C:\) after it has been formatted. In one embodiment, the program also uses a DOS utility program called ANSI.SYS, stored on the Netframe® floppy, to execute commands that modify the screen display so that when DOS FORMAT is executed, the program's screen output is piped to a screen which is similar in appearance to a screen format used by a predetermined installation program, such as IntranetWare Install, for example. In step 136, the program determines if the mirrored/duplex flag is set. If the mirrored/duplex flag is set, in step 138, the partitions of the secondary disk drive are formatted as described above. Therefore, FORMAT is run on all DOS partitions previously created (active/extended) including those of a secondary disk drive if the system is a mirrored or duplex system.

Next, in step 140, a prespecified CD driver program is copied from the Netframe® floppy to the active DOS partition of the primary disk drive. For IntranetWare installation, for example, there is only one specific driver required. Therefore, the system operator does not need to search for the correct one—it is copied automatically from the floppy. In step 142, Netframe® software which is contained on the floppy is automatically copied to the active DOS (C:\) partition. In one embodiment, the Netframe® software includes the customized startup files CONFIG.SYS and AUTOEXEC.BAT, which contains the commands to execute the CD driver, a Netframe® preparation file and Netframe® value-add software. The purpose of the Netframe® preparation file is explained in further detail below. In one embodiment, Netframe® value-add software includes Netframe® software to perform hot add/swap, Maestro (SNMP agent), and specialized LAN and SCSI drivers designed for Netframe® server monitoring and management applications. If the prespecified application program is IntranetWare, the specialized LAN and SCSI drivers should be available on the system when IntranetWare is installed. In one embodiment, a bar graph is displayed for illustrating the percentage completion of the installation of the Netframe's CD driver and value-add software.

The computer is now ready to be rebooted from the main system hard drive, the active DOS partition (C:\), which has been created and formatted, as described above. In step 144, the program prompts the user to remove the Netframe® floppy from the floppy disk drive. In step 146, the program determines whether the floppy has been removed. If the floppy has not been removed, the program continues to repeat step 144 until the floppy is removed. If the floppy is removed, the program proceeds to step 148, in which it automatically reboots the system by making a low level call to the BIOS. Upon rebooting, the BIOS will once again scan system devices and resources. However, this time the BIOS does not detect a floppy diskette in the floppy disk drive and, therefore, initiates the execution of MS-DOS which was copied to the active DOS partition (C:\) during the formatting steps as described above. The active DOS partition contains the Netframe® preparation program which was previously copied to it, as described above. Upon rebooting in step 148, the BIOS loads MS-DOS from the active DOS partition (the C:\ drive) and subsequently passes control over to CONFIG.SYS & AUTOEXEC.BAT. AUTOEXEC.BAT then executes the preparation program which performs the remaining steps described below. Additionally, in one embodiment, the preparation program modifies the AUTOEXEC.BAT file to its final version, such that subsequent reboots of the computer system will directly execute IntranetWare, rather than the preparation program. The preparation program copies this final version of AUTOEXEC.BAT to the C:\ drive.

Since the preparation program is part of the ACFI program which was originally stored on the Netframe® floppy, the preparation program is also referred to as "the program" hereafter. In step 150, the program displays Intranetware installation options. Typically, these options include whether to proceed with the installation of IntranetWare or abort the installation. In step 152, the program determines whether the operator has chosen to abort the installation of IntranetWare. If "abort installation" has been chosen by the operator, then in step 154, the program aborts the installation process and the ACFI program ends at step 200.

Figure 1D:
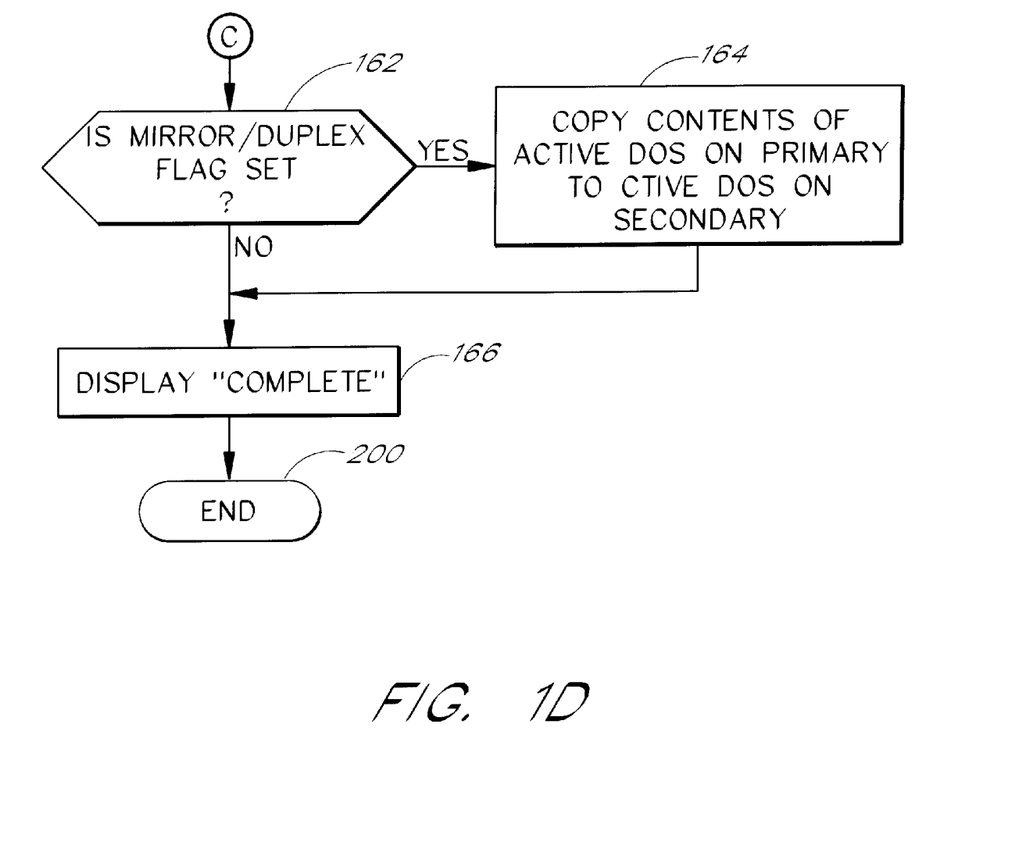

If in step 152, it is determined that the operator did not choose to abort the installation of IntranetWare, then in step 156, the program checks whether an IntranetWare Installation compact disk (CD) is present in the system's CD ROM disk drive. If the CD is not present in the disk drive, then in step 158, the program prompts a user or system operator to insert the IntranetWare CD into the CD ROM disk drive by displaying the request on a display screen of the computer system. The program then once again moves to step 156 in which it checks whether the IntranetWare CD is in the disk drive.

A compact disk is one type of storage device used by Novell® to store its Intranetware program. However, it is understood that this type of storage device is only exemplary and that any other type of storage devices which is commercially available, such as a floppy disk, may be used for purposes of storing the prespecified program therein. Similarly, the discussion of the CD ROM disk drive herein is only exemplary and it is understood that any other type of reading device which is commercially available, such as a floppy disk drive, may be utilized in the invention, depending on the type of storage device in which the prespecified program is stored.

If in step 156 it is determined that the IntranetWare CD is present, then in step 160, the program launches IntranetWare install by loading the CD driver which begins reading the IntranetWare CD from the CD ROM drive. IntranetWare Install starts from a DOS batch file called INSTALL.BAT stored on the IntranetWare CD. The program executes INSTALL.BAT from the IntranetWare CD. Once running, the IntranetWare Install program displays an instructional screen that guides a system operator through the IntranetWare Install program. In this manner, the ACFI program "encapsulates" the IntranetWare Install program within the ACFI program by automatically executing commands to load the IntranetWare application program from the CD ROM disk drive to the system's hard disk drive. Typically, Intranetware files are loaded into the free partition of the hard disk drive and the IntranetWare Install program formats the free partition into an IntranetWare partition with a root directory of SYS:\.

After the installation of IntranetWare is complete, the program proceeds to step 162 in which it checks whether a mirror/duplex flag is set. If the mirror/duplex flag is set, then in step 164 the program copies all of the contents of the primary active DOS (C:\) partition into the secondary active DOS (D:\) partition of the mirrored or duplex hard disk drive. Currently, the IntranetWare Install program copies the contents of the SYS:\ drive into a mirrored or duplex SYS:\ drive if a mirrored or duplex configuration has been selected by the user. Therefore, this step need not be performed by the ACFI program. However, it is contemplated within the scope of the invention that for other application programs which do not provide the function of copying the contents of the primary SYS:\ drive into a secondary SYS:\ drive, the ACFI program can provide this functionality. In step 166, the program displays a message that the installation process has been completed, after which, the program ends at step 200.

As described above, embodiments of the invention provide a method and system for automatically configuring and formatting a computer system for installation of a predetermined applications program and thereafter, automatically installing the desired applications program and any additional software that may be desired. The process requires only the floppy diskette which contains the automatic configure/format/installation (ACFI) program and the floppy diskette or CD which contains the desired application program. The applicant can simply insert the ACFI program floppy in a floppy disk drive of the system and the application program CD in a CD ROM disk drive of the system and let the ACFI program run its course. The ACFI program is a novel, streamlined approach to installing a prespecified application program along with additionally desired software into a computer system. For example, a user can install an IntranetWare applications program quickly and without having to perform cumbersome and time consuming tasks as required in prior art methods of installing this application program. The automated installation method and system of the invention takes the user from a system "out of the box," to an operating Novell® IntranetWare file server. Additionally, it integrates IntranetWare installation to look like a subprocess to the whole process of configuring, formatting and installing the IntranetWare program.

Another advantage of some embodiments of the invention is that it automatically configures and formats a secondary hard disk drive, and installs IntranetWare into the secondary hard disk drive, for mirrored or duplex computer/server systems. Thus, the user is relieved of manually repeating all of the configuration, formatting and installation steps for the secondary disk drive as is required in prior art methods.

The invention may be embodied in other specific forms without departing from its spirit or essential characteristics. The described embodiments are to be considered in all respects only as illustrative and not restrictive. The scope of the invention is, therefore, indicated by the appended claims, rather than by the foregoing description. All changes which come within the meaning and range of equivalency of the claims are to be embraced within their scope.

Appendix A

Incorporation by Reference of Commonly Owned Applications
The following patent applications, commonly owned and filed October 1, 1997, are hereby incorporated herein in their entirety by reference thereto:

| Title | Application No. | Attorney Docket No. |
| --- | --- | --- |
| "System Architecture for Remote Access and Control of Environmental Management" | 08/942,160 | MNFRAME.002A1 |
| "Method of Remote Access and Control of Environmental Management" | 08/942,215 | MNFRAME.002A2 |
| "System for Independent Powering of Diagnostic Processes on a Computer System" | 08/942,410 | MNFRAME.002A3 |
| "Method of Independent Powering of Diagnostic Processes on a Computer System" | 08/942,320 | MNFRAME.002A4 |
| "Diagnostic and Managing Distributed Processor System" | 08/942,402 | MNFRAME.005A1 |
| "Method for Managing a Distributed Processor System" | 08/942,448 | MNFRAME.005A2 |
| "System for Mapping Environmental Resources to Memory for Program Access" | 08/942,222 | MNFRAME.005A3 |
| "Method for Mapping Environmental Resources to Memory for Program Access" | 08/942,214 | MNFRAME.005A4 |

Appendix A-continued

Incorporation by Reference of Commonly Owned Applications
The following patent applications, commonly owned and filed October 1, 1997,
are hereby incorporated herein in their entirety by reference thereto:

| Title | Application No. | Attorney Docket No. |
|---|---|---|
| "Hot Add of Devices Software Architecture" | 08/942,309 | MNFRAME.006A1 |
| "Method for The Hot Add of Devices" | 08/942,306 | MNFRAME.006A1 |
| "Hot Swap of Devices Software Architecture" | 08/942,311 | MNFRAME.006A3 |
| "Method for The Hot Swap of Devices" | 08/942,457 | MNFRAME.006A4 |
| "Method for the Hot Add of a Network Adapter on a System Including a Dynamically Loaded Adapter Driver" | 08/943,072 | MNFRAME.006A5 |
| "Method for the Hot Add of a Mass Storage Adapter on a System Including a Statically Loaded Adapter Driver" | 08/942,069 | MNFRAME.006A6 |
| "Method for the Hot Add of a Network Adapter on a System Including a Statically Loaded Adapter Driver" | 08/942,465 | MNFRAME.006A7 |
| "Method for the Hot Add of a Mass Storage Adapter on a System Including a Dynamically Loaded Adapter Driver" | 08/962,963 | MNFRAME.006A8 |
| "Method for the Hot Swap of a Network Adapter on a System Including a Dynamically Loaded Adapter Driver" | 08/943,078 | MNFRAME.006A9 |
| "Method for the Hot Swap of a Mass Storage Adapter on a System Including a Statically Loaded Adapter Driver" | 08/942,336 | MNFRAME.006A10 |
| "Method for the Hot Swap of a Network Adapter on a System Including a Statically Loaded Adapter Driver" | 08/942,459 | MNFRAME.006A11 |
| "Method for the Hot Swap of a Mass Storage Adapter on a System Including a Dynamically Loaded Adapter Driver" | 08/942,458 | MNFRAME.006A12 |
| "Method of Performing an Extensive Diagnostic Test in Conjunction with a BIOS Test Routine" | 08/942,463 | MNFRAME.008A |
| "Apparatus for Performing an Extensive Diagnostic Test in Conjunction with a BIOS Test Routine" | 08/942,163 | MNFRAME.009A |
| "Configuration Management Method for Hot Adding and Hot Replacing Devices" | 08/941,268 | MNFRAME.010A |
| "Configuration Management System for Hot Adding and Hot Replacing Devices" | 08/942,408 | MNFRAME.011A |
| "Apparatus for Interfacing Buses" | 08/942,382 | MNFRAME.012A |
| "Method for Interfacing Buses" | 08/942,413 | MNFRAME.013A |
| "Computer Fan Speed Control Device" | 08/942,447 | MNFRAME.016A |
| "Computer Fan Speed Control Method" | 08/942,216 | MNFRAME.017A |
| "System for Powering Up and Powering Down a Server" | 08/943,076 | MNFRAME.018A |
| "Method of Powering Up and Powering Down a Server" | 08/943,077 | MNFRAME.019A |
| "System for Resetting a Server" | 08/942,333 | MNFRAME.020A |
| "Method of Resetting a Server" | 08/942,405 | MNFRAME.021A |
| "System for Displaying Flight Recorder" | 08/942,070 | MNFRAME.022A |
| "Method of Displaying Flight Recorder" | 08/942,068 | MNFRAME.023A |
| "Synchronous Communication Interface" | 08/943,355 | MNFRAME.024A |
| "Synchronous Communication Emulation" | 08/942,004 | MNFRAME.025A |
| "Software System Facilitating the Replacement or Insertion of Devices in a Computer System" | 08/942,317 | MNFRAME.026A |
| "Method for Facilitating the Replacement or Insertion of Devices in a Computer System" | 08/942,316 | MNFRAME.027A |
| "System Management Graphical User Interface" | 08/943,357 | MNFRAME.028A |
| "Display of System Information" | 08/942,195 | MNFRAME.029A |
| "Data Management System Supporting Hot Plug Operations on a Computer" | 08/942,129 | MNFRAME.030A |
| "Data Management Method Supporting Hot Plug Operations on a Computer" | 08/942,124 | MNFRAME.031A |
| "Alert Configurator and Manager" | 08/942,005 | MNFRAME.032A |
| "Managing Computer System Alerts" | 08/943,356 | MNFRAME.033A |
| "Computer Fan Speed Control System" | 08/940,301 | MNFRAME.034A |
| "Computer Fan Speed Control System Method" | 08/941,267 | MNFRAME.035A |

Appendix A-continued

Incorporation by Reference of Commonly Owned Applications
The following patent applications, commonly owned and filed October 1, 1997,
are hereby incorporated herein in their entirety by reference thereto:

| Title | Application No. | Attorney Docket No. |
|---|---|---|
| "Black Box Recorder for Information System Events" | 08/942,381 | MNFRAME.036A |
| "Method of Recording Information System Events" | 08/942,164 | MNFRAME.037A |
| "Method for Automatically Reporting a System Failure in a Server" | 08/942,168 | MNFRAME.040A |
| "System for Automatically Reporting a System Failure in a Server" | 08/942,384 | MNFRAME.041A |
| "Expansion of PCI Bus Loading Capacity" | 08/942,404 | MNFRAME.042A |
| "Method for Expanding PCI Bus Loading Capacity" | 08/942,223 | MNFRAME.043A |
| "System for Displaying System Status" | 08/942,347 | MNFRAME.044A |
| "Method of Displaying System Status" | 08/942,071 | MNFRAME.045A |
| "Fault Tolerant Computer System" | 08/942,194 | MNFRAME.046A |
| "Method for Hot Swapping of Network Components" | 08/943,044 | MNFRAME.047A |
| "A Method for Communicating a Software Generated Pulse Waveform Between Two Servers in a Network" | 08/942,221 | MNFRAME.048A |
| "A System for Communicating a Software Generated Pulse Waveform Between Two Servers in a Network" | 08/942,409 | MNFRAME.049A |
| "Method for Clustering Software Applications" | 08/942,318 | MNFRAME.050A |
| "System for Clustering Software Applications" | 08/942,411 | MNFRAME.051A |
| "Method for Automatically Configuring a Server after Hot Add of a Device" | 08/942,319 | MNFRAME.052A |
| "System for Automatically Configuring a Server after Hot Add of a Device" | 08/942,331 | MNFRAME.053A |
| "System for Automatically Configuring and Formatting a Computer System and Installing Software" | 08/941,955 | MNFRAME.055A |
| "Determining Slot Numbers in a Computer" | 08/942,462 | MNFRAME.056A |
| "System for Detecting Errors in a Network" | 081942,169 | MNFRAME.058A |
| "Method of Detecting Errors in a Network" | 08/940,302 | MNFRAME.059A |
| "System for Detecting Network Errors" | 08/942,407 | MNFRAME.060A |
| "Method of Detecting Network Errors" | 08/942,573 | MNFRAME.061A |

What is claimed is:

1. A method of automatically configuring and formatting a computer system having a random access memory for installation of a prespecified application program in the computer system, comprising:
   automatically creating a primary active DOS partition on a primary hard disk drive of the computer system;
   automatically selecting, based upon the size of the random access memory, a size value for a primary extended DOS partition;
   automatically creating the primary extended DOS partition on the primary hard disk drive, wherein the size of the primary extended DOS partition equals the selected size value; and
   automatically formatting each partition so as to create a root directory and a file allocation table for each partition.

2. The method of claim 1 further comprising automatically rebooting the computer system, after the act of automatically creating the primary extended DOS partition.

3. The method of claim 1 further comprising executing an operating system software program stored on a first memory device.

4. The method of claim 3 further comprising executing a CONFIG.SYS startup file and an AUTOEXEC.BAT startup file stored on a first memory device, wherein the CONFIG.SYS and the AUTOEXEC.BAT startup files are customized for installing the prespecified software application program.

5. The method of claim 4 further comprising:
   automatically copying a specified driver to the primary active DOS partition;
   automatically copying the customized CONFIG.SYS and AUTOEXEC.BAT startup files to the primary active DOS partition; and
   automatically rebooting the computer system.

6. The method of claim 5 further comprising automatically executing a DOS batch file in order to install said prespecified application program.

7. The method of claim 1 further comprising prompting a system operator to indicate whether the computer system is a single disk drive system or a dual disk drive system.

8. The method of claim 7 further comprising:
   determining whether a dual hard disk drive system has been indicated by the system operator;
   if a dual hard disk drive system has been indicated, automatically partitioning a secondary hard disk drive so as to create a secondary active DOS partition which matches the primary active DOS partition of the primary hard disk drive; and
   if a dual hard disk drive system has been indicated, automatically partitioning the secondary hard disk drive so as to create a secondary extended DOS partition which matches the primary extended DOS partition of the primary hard disk drive.

9. The method of claim 8 further comprising, if a dual hard disk drive system has been selected, automatically formatting the secondary active DOS partition and the secondary extended DOS partition so as to create a root directory and a file allocation table for each secondary partition.

10. The method of claim 9 further comprising if a dual hard disk drive system has been selected, automatically copying information from the primary active DOS partition to the secondary active DOS partition.

11. The method of claim 8 wherein:
the act of automatically creating the primary active DOS partition on the primary hard disk drive comprises writing information from a Boot Record file contained on a diskette to appropriate sectors on the primary hard disk drive by making a first low level call to BIOS;
the act of automatically creating the primary extended DOS partition on the primary hard disk drive comprises writing information from an Extended Boot Record file contained on the diskette to appropriate sectors on the primary hard disk drive by making a second low level call to BIOS; and
the act of automatically creating the secondary active DOS partition on the secondary hard disk drive comprises writing information from the Boot Record file contained on the diskette to appropriate sectors on the secondary hard disk drive by making a third low level call to BIOS; and
the act of automatically creating the secondary extended DOS partition on the secondary hard disk drive comprises writing information from the Extended Boot Record file contained on the diskette to appropriate sectors on the secondary hard disk drive by making a fourth low level call to BIOS.

12. The method of claim 1 wherein:
the act of automatically creating an active DOS partition on the primary hard disk drive comprises writing information from a Boot Record file contained on a diskette to appropriate sectors on the primary hard disk drive by making a first low level call to BIOS; and
the act of automatically creating an extended DOS partition on the primary hard disk drive comprises writing information from an Extended Boot Record file contained on the diskette to appropriate sectors on the primary hard disk drive by making a second low level call to BIOS.

13. The method of claim 1 wherein the act of automatically selecting a size value for the primary extended DOS partition comprises:
determining a size of a random access memory of the computer system;
comparing the size to a reference value; and
setting the size value of the primary extended DOS partition, wherein if the size is greater than the reference value, the size value for the primary extended DOS partition is set to a first value, and if the size is less than the reference value, the size value is set to a second value.

14. The method of claim 13 wherein the first value is two gigabytes and the second value is one gigabyte.

15. The method of claim 1, additionally comprising repeating the step of automatically creating a primary active DOS partition upon determining that the primary disk drive is mirrored or duplexed.

16. A method of automatically configuring and formatting a computer system having a random access memory and installing a prespecified program, comprising:
inserting a first memory device into a first reading device of the computer system;
supplying power to the computer system;
executing an operating system program in the computer system, wherein the operating system program is stored on a first memory device;
automatically creating a primary active DOS partition on a primary hard disk drive of the computer system;
automatically selecting, based upon the size of the random access memory, a size value for a primary extended DOS partition;
automatically creating the primary extended DOS partition, wherein the size of the primary extended DOS partition equals the selected size value;
automatically rebooting the computer system for a first time by making a first low level call to BIOS;
automatically formatting the primary active and extended DOS partitions so as to create a root directory and a file allocation table for each partition;
automatically copying a specified driver to the primary active DOS partition;
automatically copying customized CONFIG.SYS and AUTOEXEC.BAT startup files from a first memory device to the primary active DOS partition;
removing a first memory device from a first reading device;
automatically rebooting the computer system for a second time by making a second low level call to BIOS;
inserting a second memory device into a second reading device of the computer system, wherein the second memory device contains the prespecified program; and
automatically executing a DOS batch file in order to install said prespecified program.

17. The method of claim 16 further comprising:
prompting a system operator as to whether the computer system is a single hard disk drive system or a dual hard disk drive system;
determining whether a dual hard disk drive system has been indicated by a system operator;
if a dual hard disk drive architecture has been selected, automatically partitioning a secondary hard disk drive so as to create a secondary active DOS partition which matches the primary active DOS partition created for the primary hard disk drive; and
if a dual hard disk drive system has been selected, automatically partitioning the secondary hard disk drive so as to create a secondary extended DOS partition which matches the primary extended DOS partition created for the primary hard disk drive.

18. The method of claim 17 further comprising, if a dual hard disk drive system has been selected, automatically formatting the secondary active DOS partition and the secondary extended DOS partition so as to create a root directory and a file allocation table for each secondary partition.

19. The method of claim 18 further comprising if a dual hard disk drive system has been selected, automatically copying information from the primary active DOS partition to the secondary active DOS partition.

20. The method of claim 17 wherein:
the act of automatically creating the primary active DOS partition on the primary hard disk drive comprises writing information from a Boot Record file contained on a diskette to appropriate sectors on the primary hard disk drive by making a first low level call to BIOS;

the act of automatically creating the primary extended DOS partition on the primary hard disk drive comprises writing information from an Extended Boot Record file contained on the diskette to appropriate sectors on the primary hard disk drive by making a second low level call to BIOS; and the act of automatically creating the secondary active DOS partition on the secondary hard disk drive comprises writing information from the Boot Record file contained on the diskette to appropriate sectors on the secondary hard disk drive by making a third low level call to BIOS; and the act of automatically creating the secondary extended DOS partition on the secondary hard disk drive comprises writing information from the Extended Boot Record file contained on the diskette to appropriate sectors on the secondary hard disk drive by making a fourth low level call to BIOS.

21. The method of claim 15, additionally comprising repeating the step of automatically creating a primary active DOS partition upon determining that the primary disk drive is mirrored or duplexed.

* * * * *